(12) United States Patent
Urushibata et al.

(10) Patent No.: US 11,465,687 B2
(45) Date of Patent: Oct. 11, 2022

(54) AUTOMOBILE STRUCTURAL MEMBER

(71) Applicant: NIPPON STEEL CORPORATION, Tokyo (JP)

(72) Inventors: Ryo Urushibata, Tokyo (JP); Yasuhiro Ito, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/286,298

(22) PCT Filed: Oct. 23, 2019

(86) PCT No.: PCT/JP2019/041533
§ 371 (c)(1),
(2) Date: Apr. 16, 2021

(87) PCT Pub. No.: WO2020/085385
PCT Pub. Date: Apr. 30, 2020

(65) Prior Publication Data
US 2021/0339801 A1 Nov. 4, 2021

(30) Foreign Application Priority Data
Oct. 24, 2018 (JP) .............................. JP2018-199829

(51) Int. Cl.
*B62D 21/15* (2006.01)
*B60R 19/18* (2006.01)
(Continued)

(52) U.S. Cl.
CPC ............ *B62D 21/152* (2013.01); *B60R 19/18* (2013.01); *B62D 25/025* (2013.01); *B62D 25/04* (2013.01); *B60R 2019/1866* (2013.01)

(58) Field of Classification Search
CPC ...... B62D 21/152; B62D 21/14; B62D 21/02; B62D 25/025; B62D 25/04; B60R 19/18
USPC ........... 296/187.01, 9, 11, 1, 193.06, 29, 30; 293/102, 122, 123; 52/793.11, 14, 17, 52/19, 18
See application file for complete search history.

(56) References Cited

U.S. PATENT DOCUMENTS 3,086,625 A * 4/1963 Wyatt .................... B21D 47/00
52/783.17
5,632,126 A * 5/1997 Agsten .................. E04B 2/8635
52/106
2010/0066106 A1 3/2010 Nojima et al.

FOREIGN PATENT DOCUMENTS

EP 2 272 737 A1 1/2011
JP 4-109683 U 9/1992
(Continued)

*Primary Examiner* — Dennis H Pedder
(74) *Attorney, Agent, or Firm* — Birch, Stewart, Kolasch & Birch, LLP

(57) ABSTRACT

An automobile structural member being a hollow automobile structural member having: a top wall part; a bottom wall part facing the top wall part; and a pair of heightwise wall parts that connect to the top wall part and the bottom wall part, the automobile structural member including a first corrugated reinforcing member being inside the automobile structural member, wherein: a bottom portion and a top portion of the first corrugated reinforcing member extend in a direction from the top wall part toward the bottom wall part; and the bottom portion of the first corrugated reinforcing member is joined to an inner surface of the heightwise wall part of either of a pair of the heightwise wall parts.

8 Claims, 13 Drawing Sheets

(51) Int. Cl.
*B62D 25/02* (2006.01)
*B62D 25/04* (2006.01)

(56) References Cited

FOREIGN PATENT DOCUMENTS

| | | |
|---|---|---|
| JP | 9-24864 A | 1/1997 |
| JP | 10-278707 A | 10/1998 |
| JP | 11-255048 A | 9/1999 |
| JP | 2003-306171 A | 10/2003 |
| JP | 2006-207679 A | 8/2006 |
| JP | 2006-282106 A | 10/2006 |
| JP | 2008-265738 A | 11/2008 |
| JP | 2011-131791 A | 7/2011 |
| JP | 2014-91462 A | 5/2014 |
| JP | 2015-63208 A | 4/2015 |
| JP | 2016-10982 A | 1/2016 |
| WO | WO 2013/153872 A1 | 10/2013 |

* cited by examiner

LADDER FRAME

AUTOMOBILE STRUCTURAL MEMBER

TECHNICAL FIELD

The present invention relates to an automobile structural member.

BACKGROUND ART

In recent years, a reduction in weight of an automobile vehicle body has been promoted, in response to severity of CO2 emission control of automobile. Further, with respect to a structural member such as a side sill or a bumper beam, further improvement in energy absorption performance when a collision occurs has been demanded.

Patent Document 1 discloses a structure in which ribs for reinforcement are provided inside a bumper reinforcing member for automobile. Patent Document 2 discloses a structure having a pair of main stays disposed between facing walls of a hollow member and each having a bent portion and a reinforcing stay disposed between the bent portions of a pair of the main stays. Patent Document 3 discloses an automobile reinforcing member in which one corrugated member is disposed between a pair of side walls. Patent Document 4 discloses a structure in which one corrugated member is disposed inside a lower member. Patent Document 5 discloses a structure in which a plurality of ribs formed in an X shape and made of synthetic resin are disposed inside a side sill. Patent Document 6 discloses a structure in which a zigzag bent impact absorbing member made of CFRP is disposed inside a side sill. Patent Document 7 discloses a structure in which bellows-shaped ribs integrated with heightwise walls and a lower wall of a lower member are provided. Patent Document 8 discloses a structure in which a reinforcing plate formed with square projections and recesses is attached to a side portion of a frame. Patent Document 9 discloses a structure in which a hat-shaped reinforcing member is disposed inside a hat-shaped cross member. In the cross member structure in Patent Document 9, a plurality of recessed portions are formed on a heightwise wall of the reinforcing member, and a flange of the cross member and a flange of the reinforcing member are joined to each other. Patent Document 10 discloses a metal absorber in which recess-shaped or projection-shaped beads are formed on a heightwise wall of a hat-shaped member. Patent Document 11 discloses an impact absorbing member in which a bellows-shaped deformation promoting means formed of mountain portions and valley portions is provided on a hollow member.

PRIOR ART DOCUMENT

Patent Document

Patent Document 1: Japanese Laid-open Patent Publication No. H10-278707
Patent Document 2: Japanese Laid-open Patent Publication No. H11-255048
Patent Document 3: Japanese Unexamined Utility Model Application Publication No. H4-109683
Patent Document 4: Japanese Laid-open Patent Publication No. 2016-010982
Patent Document 5: International Publication Pamphlet No. WO 2013/153872
Patent Document 6: Japanese Laid-open Patent Publication No. 2014-091462
Patent Document 7: Japanese Laid-open Patent Publication No. 2003-306171
Patent Document 8: Japanese Laid-open Patent Publication No. 2011-131791
Patent Document 9: Japanese Laid-open Patent Publication No. H9-024864
Patent Document 10: Japanese Laid-open Patent Publication No. 2008-265738
Patent Document 11: Japanese Laid-open Patent Publication No. 2006-207679

SUMMARY OF THE INVENTION

Problems to be Solved by the Invention

Only making a sheet thickness of a structural member small as the purpose of a reduction in weight of a vehicle body causes a reduction in surface rigidity, and therefore, for the purpose of the reduction in weight, by improving the structures of the automobile structural members as in Patent Documents 1 to 11, the energy absorption performance is required to be maintained or improved. However, in the structures disclosed in Patent Documents 1 to 11, there is room for improvement from a viewpoint of energy absorption efficiency (weight efficiency of energy absorption performance).

The present invention has been made in view of the above-described circumstances, and an object thereof is to improve an energy absorption efficiency in an automobile structural member.

Means for Solving the Problems

One aspect of the present invention for solving the above-described problems is an automobile structural member being a hollow automobile structural member having: a top wall part; a bottom wall part facing the top wall part; and a pair of heightwise wall parts that connect to the top wall part and the bottom wall part, the automobile structural member including a first corrugated reinforcing member being inside the automobile structural member, wherein: a bottom portion and a top portion of the first corrugated reinforcing member extend in a direction from the top wall part toward the bottom wall part; and the bottom portion of the first corrugated reinforcing member is joined to an inner surface of the heightwise wall part of either of a pair of the heightwise wall parts.

It is possible that an end face on the top wall part side of the first corrugated reinforcing member is in contact with the top wall part, and an end face on the bottom wall part side of the first corrugated reinforcing member is in contact with the bottom wall part. It is possible that the end face on the top wall part side of the first corrugated reinforcing member is joined to the top wall part, or the end face on the bottom wall part side of the first corrugated reinforcing member is joined to the bottom wall part. It is possible that the end face on the top wall part side of the first corrugated reinforcing member is joined to the top wall part, and the end face on the bottom wall part side of the first corrugated reinforcing member is joined to the bottom wall part.

It is possible that a distance between a plane formed by a plurality of bottom portions and a plane formed by a plurality of top portions of the first corrugated reinforcing member is 8 to 40% of a distance between the two heightwise wall parts of the automobile structural member.

It is possible that the automobile structural member further includes the other first corrugated reinforcing member whose bottom portion is joined to the heightwise wall part facing the heightwise wall part which to the first corrugated reinforcing member is joined, inside the automobile structural member.

It is possible that the automobile structural member further includes a second reinforcing member extending along a longitudinal direction of the automobile structural member, wherein the second reinforcing member is joined to the top portion of the first corrugated reinforcing member.

It is possible that the heightwise wall part and the first corrugated reinforcing member are integrally molded. It is possible that an angle which the first corrugated reinforcing member forms with the top wall part is substantially perpendicular.

It is possible that the automobile structural member is a side sill, a bumper beam, a center pillar, a side member of a ladder frame, or a cross member of a ladder frame.

Effect of the Invention

It is possible to improve an energy absorption efficiency.

EMBODIMENTS FOR CARRYING OUT INVENTION

Figure 1:
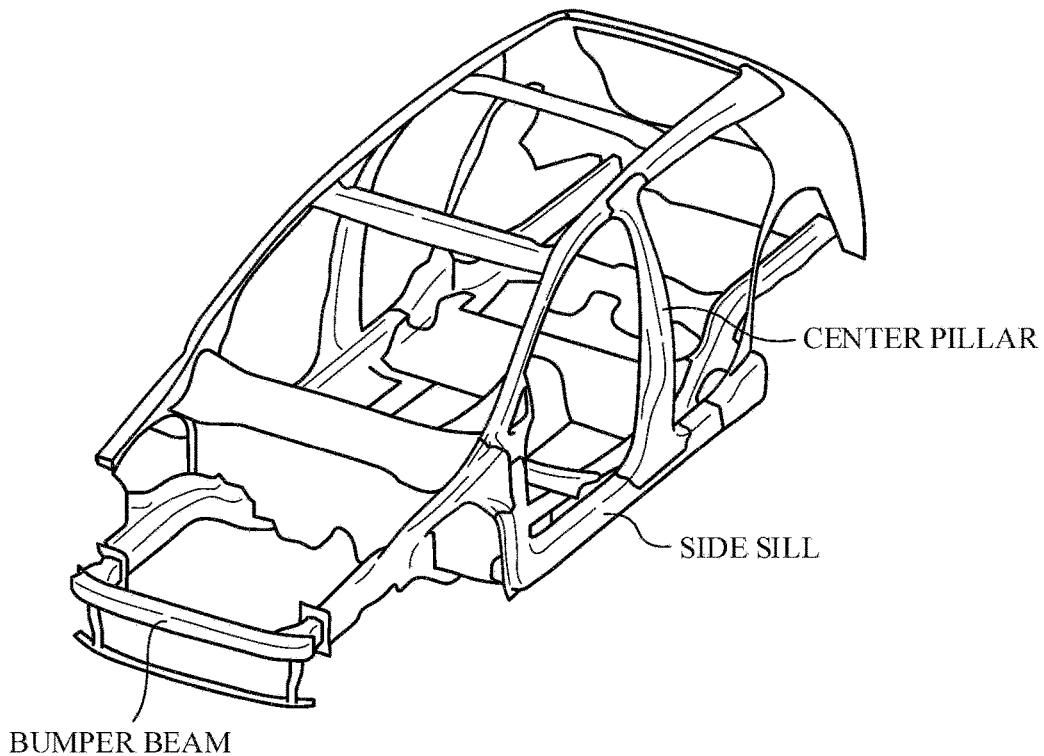
FIG. 1 is a view illustrating one example of a vehicle body framework of an automobile.

Hereinafter, one embodiment of the present invention will be described while referring to the drawings. Note that in the present description and the drawings, elements having substantially the same functional configurations are denoted by the same codes to omit overlapped explanation.

Figure 2:
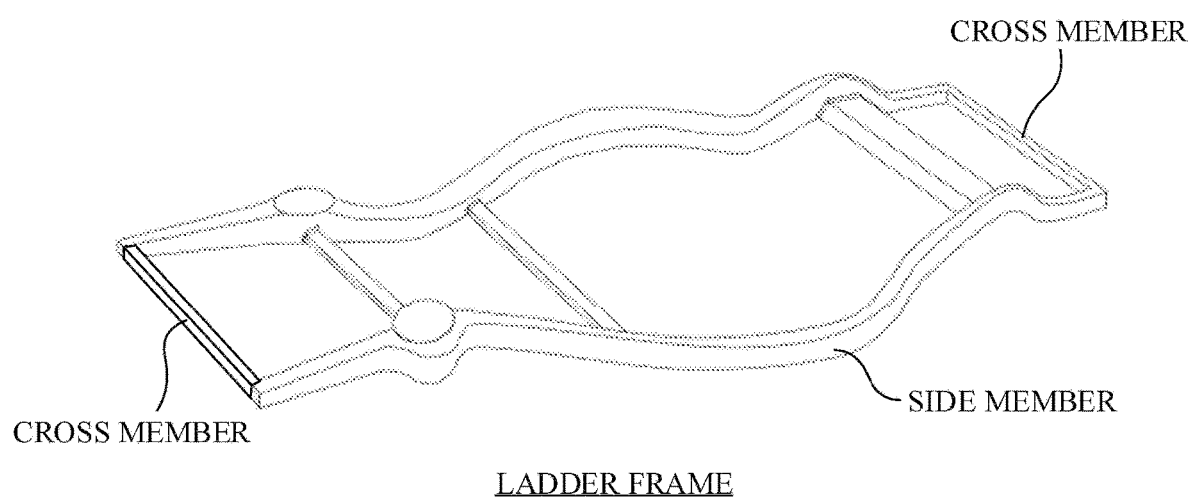
FIG. 2 is a view illustrating one example of a ladder frame.

FIG. 1 is a view illustrating one example of a vehicle body framework of an automobile. An automobile structural member of this embodiment is applicable as a side sill, a bumper beam, or a center pillar, for example. Further, the automobile structural member is applicable as a side member of a ladder frame or a cross member of the ladder frame as illustrated in FIG. 2.

First Embodiment

Figure 3:
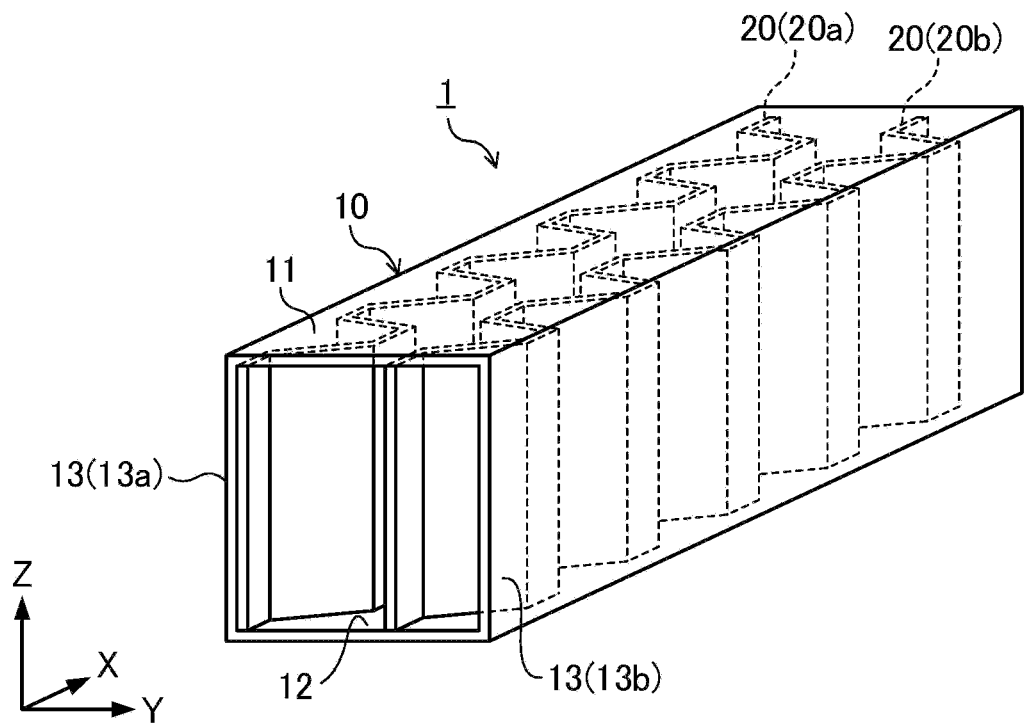
FIG. 3 is a perspective view illustrating a schematic configuration of an automobile structural member according to a first embodiment of the present invention.
Figure 4:
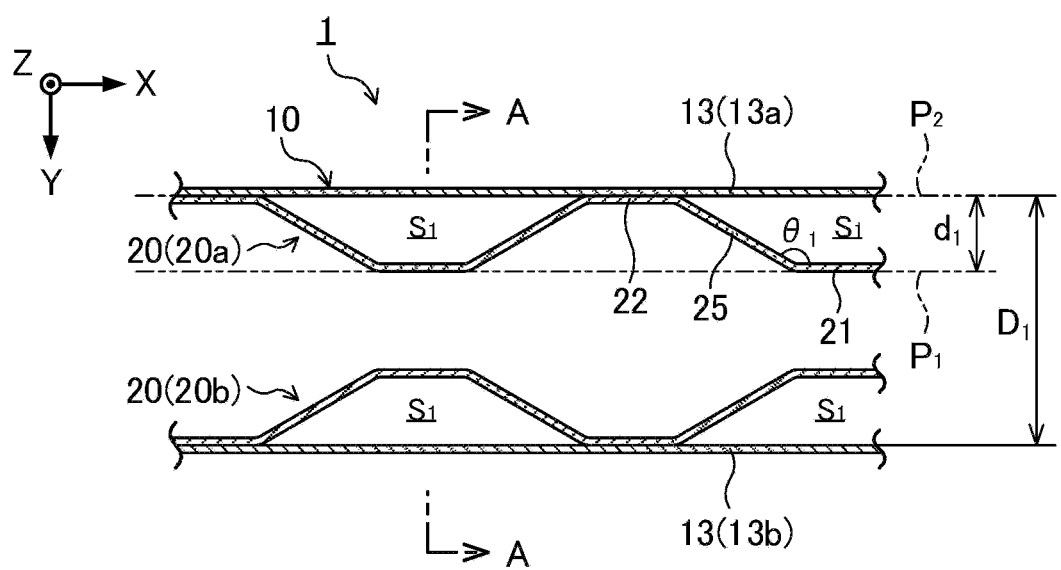
FIG. 4 is a view illustrating a cross section parallel to a top wall part of the automobile structural member in FIG. 3.
Figure 5:
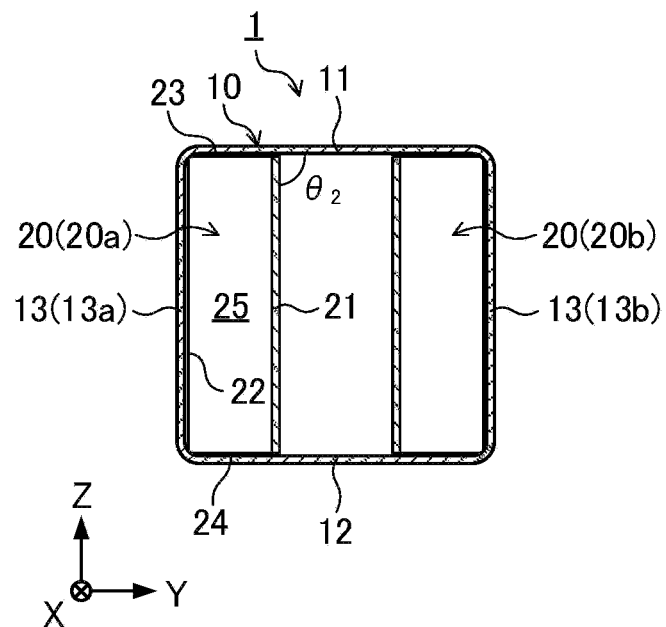
FIG. 5 is a view illustrating an A-A cross section in FIG. 4.

As illustrated in FIG. 3 to FIG. 5, an automobile structural member 1 of this embodiment has a hollow section 10 in a shape of angular tube, and the hollow section 10 is configured by four wall parts. Specifically, the hollow section 10 has four wall parts composed of a top wall part 11, a bottom wall part 12 facing the top wall part 11, and a first heightwise wall part 13a and a second heightwise wall part 13b being a pair of heightwise wall parts 13 that connect to the top wall part 11 and the bottom wall part 12. A material of each of the top wall part 11, the bottom wall part 12, and a pair of the heightwise wall parts 13 is not particularly limited, and for example, a steel material, an aluminum alloy member, a magnesium alloy member, various resin materials such as a fiber reinforced resin, and so on, can be employed.

In the hollow section 10 of this embodiment, the top wall part 11 and the bottom wall part 12 are parallel to each other, and the first heightwise wall part 13a and the second heightwise wall part 13b are parallel to each other. Further, the first heightwise wall part 13a and the second heightwise wall part 13b are each substantially perpendicular to the top wall part 11 and the bottom wall part 12. Note that the wall parts in a parallel relation need not be parallel to each other in a strict manner. For example, the hollow section 10 may have a cross-sectional shape such as a trapezoid in which the two heightwise wall parts 13a, 13b are inclined. Further, each of the wall parts configuring the hollow section 10 may also be partially provided with a bead, a hole, or the like. A sheet thickness of each of the wall parts configuring the hollow section 10 is, for example, 1 to 5 mm A length of the automobile structural member 1 is, for example, 300 to 3000 mm, and a size of a cross section perpendicular to a longitudinal direction of the member is, for example, 50 to 200 mm square.

When the automobile structural member 1 is the side sill or the side member of the ladder frame as in FIG. 2, for example, the X direction is a vehicle length direction, the Y direction is a vehicle height direction, and the Z direction is a vehicle width direction. When the automobile structural member 1 is the bumper beam or the cross member of the ladder frame as in FIG. 2, for example, the X direction is the vehicle width direction, the Y direction is the vehicle height direction, and the Z direction is the vehicle length direction. When the automobile structural member 1 is the center pillar, for example, the X direction is the vehicle height direction, the Y direction is the vehicle length direction, and the Z direction is the vehicle width direction. Note that the X direction, the Y direction, and the Z direction are directions perpendicular to each other.

The top wall part 11 is, between a wall part positioned on a vehicle-exterior side and a wall part positioned on a vehicle-interior side of the hollow section 10, the wall part positioned on the vehicle-exterior side. When the automobile structural member 1 is the side sill, the center pillar, or the side member of the ladder frame, for example, the wall part on the vehicle-exterior side is the top wall part according to the present invention and the wall part on the vehicle-interior side is the bottom wall part according to the present invention, in the vehicle width direction. When the automobile structural member 1 is a front bumper beam or the cross member on the front side of the ladder frame, for example, the wall part on the front side in the vehicle length direction is the top wall part according to the present invention, and the wall part on the rear side in the vehicle length direction is the bottom wall part according to the present invention. When the automobile structural member 1 is a rear bumper beam or the cross member on the rear side of the ladder frame, for example, the wall part on the rear side in the vehicle length direction is the top wall part according to the present invention, and the wall part on the front side in the vehicle length direction is the bottom wall part according to the present invention. That is, the direction required to be reinforced enough to withstand an impact load or the like becomes the Z direction.

Figure 6:
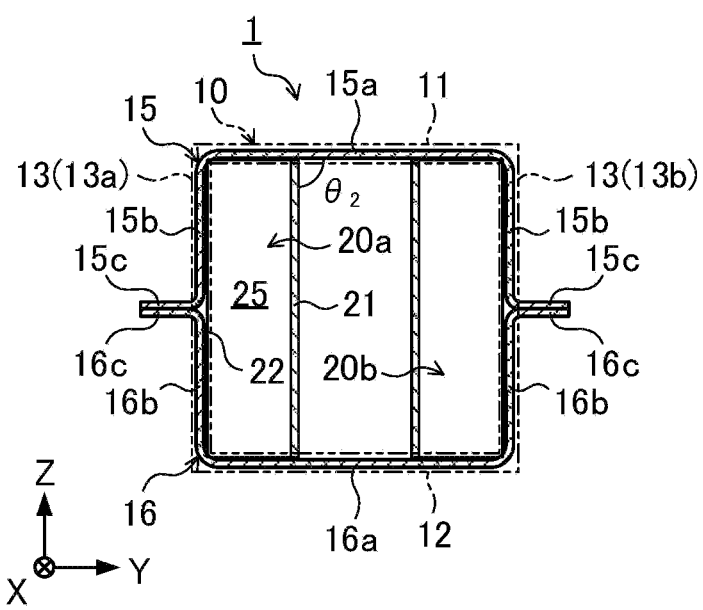
FIG. 6 is a view illustrating one example of a cross-sectional shape of an automobile structural member.

The top wall part 11, the bottom wall part 12, the first heightwise wall part 13a, and the second heightwise wall part 13b may be manufactured through integral molding such as extrusion molding, or may be manufactured in a manner that an outer panel and an inner panel are joined to each other, for example. Further, the hollow section 10 may also be configured by an outer panel 15 molded in a hat shape and an inner panel 16 molded in a hat shape, as illustrated in FIG. 6, for example. In the example in FIG. 6, the outer panel 15 has a top wall part 15a, heightwise wall parts 15b, and flange parts 15c, and the inner panel 16 has a top wall part 16a, heightwise wall parts 16b, and flange parts 16c. Then, the flange parts 15c of the outer panel 15 and the flange parts 16c of the inner panel 16 are joined to each other, to thereby configure the hollow section 10. Also in the case of FIG. 6, the hollow section 10 has the previously-described top wall part 11, bottom wall part 12, and pair of heightwise wall parts 13. Specifically, in the example in FIG. 6, the top wall part 15a of the outer panel 15 corresponds to the top wall part 11 of the hollow section 10, and the top wall part 16a of the inner panel 16 corresponds to the bottom wall part 12 of the hollow section 10. Further, a pair of the heightwise wall parts 13a, 13b of the hollow section 10 are configured by the heightwise wall parts 15b of the outer panel 15 and the heightwise wall parts 16b of the inner panel 16.

Figure 7:
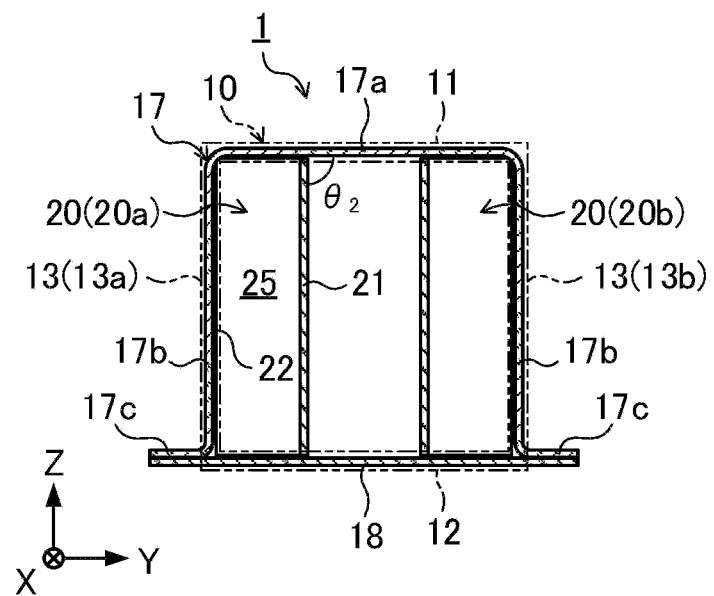
FIG. 7 is a view illustrating one example of a cross-sectional shape of an automobile structural member.
Figure 8:
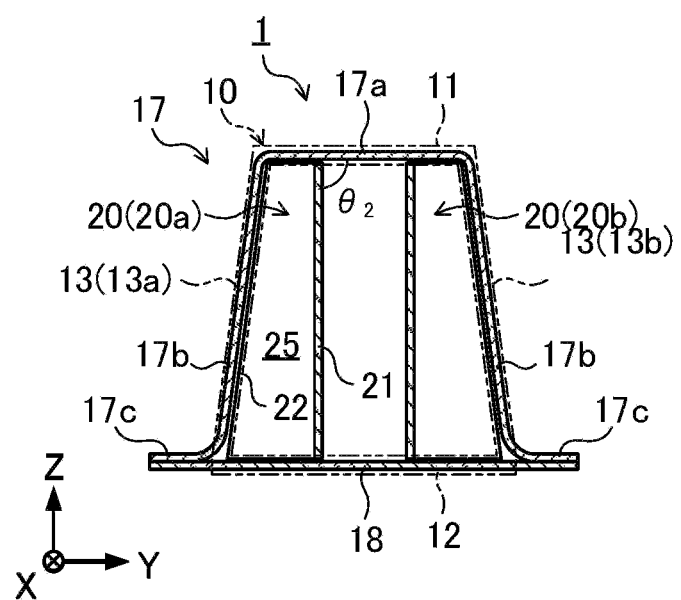
FIG. 8 is a view illustrating one example of a cross-sectional shape of an automobile structural member.

The hollow section 10 may also be configured in a manner that flange parts 17c of a hat-shaped panel 17 and a plate 18 are mutually joined, as in FIG. 7. In the example in FIG. 7, a top wall part 17a of the panel 17 corresponds to the top wall part 11 of the hollow section 10, a pair of heightwise wall parts 17b of the panel 17 correspond to a pair of the heightwise wall parts 13a, 13b of the hollow section 10, and the plate 18 corresponds to the bottom wall part 12 of the hollow section 10. Further, the heightwise wall parts 13 need not be perpendicular to the top wall part 11 as is the hat-shaped panel 17 illustrated in FIG. 8.

FIG. 4 is a view illustrating a cross section parallel to the top wall part 11 of the automobile structural member 1. The hollow automobile structural member 1 has a first corrugated reinforcing member 20 inside.

The two first corrugated reinforcing members 20 are provided in this embodiment, and the first corrugated reinforcing member 20a is joined to an inner surface of the first heightwise wall part 13a, and the first corrugated reinforcing member 20b is joined to an inner surface of the second heightwise wall part 13b. Note that the two first corrugated reinforcing members 20a, 20b are not in contact with each other. That is, there is a gap between the two first corrugated reinforcing members 20a, 20b. Further, the first corrugated reinforcing member 20a and the first corrugated reinforcing member 20b need not have the same shape as each other.

The "corrugated reinforcing member" is a member provided with projecting portions and recessed portions alternately along the member longitudinal direction (X direction) of the automobile structural member 1. In this embodiment, of the first corrugated reinforcing member 20, a portion on a side joined to the heightwise wall part 13 is referred to as a "bottom portion 22", and a portion on a side opposite to the joint side of the heightwise wall part 13 is referred to as a "top portion 21". In the first corrugated reinforcing member 20, the top portion 21 and the bottom portion 22 extend in a direction from the top wall part 11 toward the bottom wall part 12 of the automobile structural member 1. That is, a cross-sectional shape of the first corrugated reinforcing member 20 perpendicular to the direction from the top wall part 11 toward the bottom wall part 12 of the automobile structural member 1 (Z direction) is substantially the same, and a direction in which the respective top portions 21 of the first corrugated reinforcing member 20 range and a direction in which the respective bottom portions 22 of the first corrugated reinforcing member 20 range become the Z direction. From a viewpoint of improvement in energy absorption efficiency, the top portion 21 and the bottom portion 22 preferably extend from an end face 23 (FIG. 5) on the top wall part 11 side to an end face 24 (FIG. 5) on the bottom wall part 12 side of the first corrugated reinforcing member 20. A sheet thickness of the first corrugated reinforcing member 20 is preferably 0.5 to 1.2 times as large as a sheet thickness of the wall pars configuring the hollow section 10, for example. A lower limit thereof may be set to 0.6 times or 0.7 times as large as the sheet thickness of the wall parts, and an upper limit thereof may be set to 1.0 times or 0.8 times as large as the sheet thickness of the wall parts.

Figure 9:
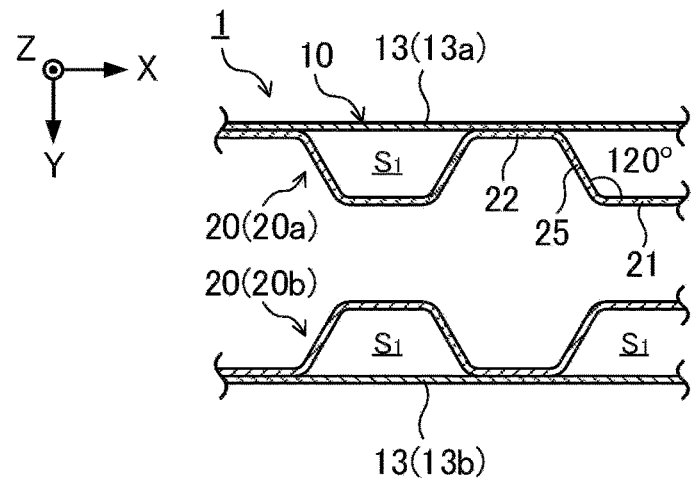
FIG. 9 is a view illustrating one example of a first corrugated reinforcing member.

The first corrugated reinforcing members 20 of this embodiment each have such a shape as a hat-shaped sheet pile in a cross section parallel to the top wall part 11 of the automobile structural member 1, in each of which the top portions 21 and the bottom portions 22 are in a planar shape parallel to the heightwise wall parts 13, as illustrated in FIG. 4. The first corrugated reinforcing members 20 illustrated in FIG. 4 each indicate an example in which an angle $\theta_1$ which a side portion 25 between the top portion 21 and the bottom portion 22 forms with the top portion 21 is 150 degrees, but the angle $\theta_1$ may be different angles, for example, as in FIG. 9 to FIG. 11, and is not particularly limited. From a viewpoint of effectively improving the energy absorption efficiency, the angle $\theta_1$ is preferably 60 to 150 degrees. The angle $\theta_1$ is more preferably 70 degrees or more, and further preferably 80 degrees or more. Further, the angle $\theta_1$ is more preferably 120 degrees or less, and further preferably 110 degrees or less.

From a viewpoint of the improvement in energy absorption efficiency, an angle $\theta_2$ which the top portion 21 of the first corrugated reinforcing member 20 forms with the top wall part 11 of the automobile structural member 1 is preferably substantially perpendicular as in FIG. 5 to FIG. 8. For example, the angle $\theta_2$ is preferably 85 to 95 degrees. In particular, even when the bottom portion 22 of the first corrugated reinforcing member 20 is not substantially perpendicular to the top wall part 11 due to a shape following the heightwise wall part 13 of the automobile structural member 1 as in FIG. 8, from a viewpoint of the improvement in energy absorption efficiency, the angle $\theta_2$ which the top portion 21 forms with the top wall part 11 is preferably 85 to 95 degrees.

A distance $d_1$ between a (virtual) plane $P_2$ formed by a plurality of bottom portions 22 and a (virtual) plane $P_1$ formed by a plurality of top portions 21 of the first corrugated reinforcing member 20 is preferably a length of 8 to 40% of a (minimum) distance $D_1$ between the two heightwise wall parts 13a, 13b. When the distance $d_1$ falls within a range of this numeric values, the energy absorption efficiency can be effectively improved. The distance $d_1$ is more preferably a length of 30% or less of the distance $D_1$, and further preferably a length of 25% or less or 20% or less thereof. A lower limit of the distance $d_1$ may be a length of 10% or more or 12% or more of the distance $D_1$. The distance $d_1$ can be regarded as a width in the Y direction of the first corrugated reinforcing member. Here, the Y direction is a direction perpendicular to the longitudinal direction of the hollow automobile member and the direction from the top wall part 11 toward the bottom wall part 12.

Figure 12:
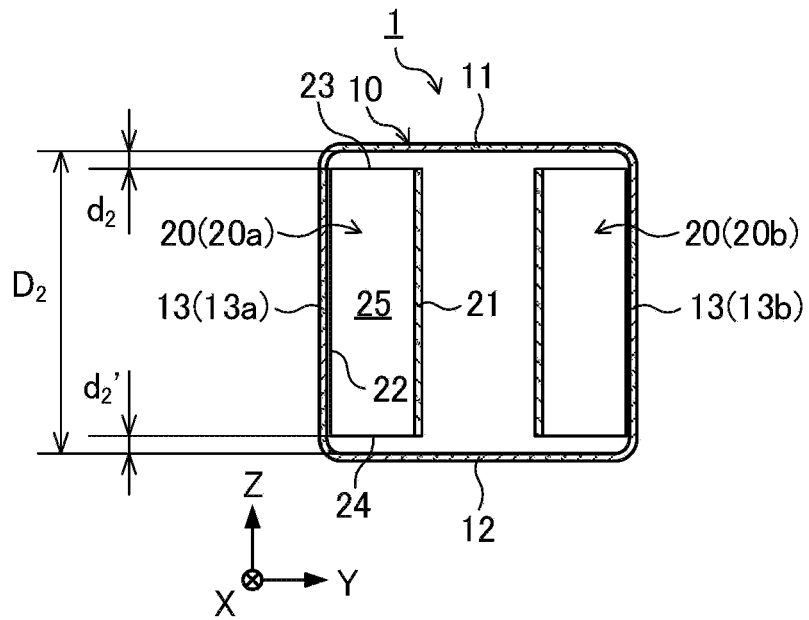
FIG. 12 is a view illustrating one example of a first corrugated reinforcing member.

It is preferable that one end portion is positioned in the vicinity of the top wall part 11 and the other end portion is positioned in the vicinity of the bottom wall part 12 in the Z direction of the first corrugated reinforcing member 20. For example, a distance $d_2$ between the top wall part 11 of the automobile structural member 1 and the end face 23 on the top wall part 11 side of the first corrugated reinforcing member 20 is preferably a length of 20% or less, and more preferably a length of 10% or less or 5% or less, of a distance $D_2$ between the top wall part 11 and the bottom wall part 12 as in FIG. 12. Further, a distance $d_2$' between the bottom wall part 12 of the automobile structural member 1 and the end face 24 on the bottom wall part 12 side of the first corrugated reinforcing member 20 is preferably a length of 20% or less, and more preferably a length of 10% or less or 5% or less, of the distance $D_2$ between the top wall part 11 and the bottom wall part 12. From a viewpoint of the improvement in energy absorption efficiency, in the first corrugated reinforcing member 20, it is more preferable that the end face 23 on the top wall part 11 side is in contact with the top wall part 11 of the automobile structural member 1 or the end face 24 on the bottom wall part 12 side is in contact with the bottom wall part 12 of the automobile structural member 1. Further, it is further preferable that the end face 23 on the top wall part 11 side is in contact with the top wall part 11 and the end face 24 on the bottom wall part 12 side is in contact with the bottom wall part 12. From a viewpoint of further improvement in energy absorption efficiency, it is preferable that the end face 23 on the top wall part 11 side of the first corrugated reinforcing member 20 is joined to the top wall part 11 of the automobile structural member 1 or the end face 24 on the bottom wall part 12 side of the first corrugated reinforcing member 20 is joined to the bottom wall part 12 of the automobile structural member 1. Further, it is further preferable that the end face 23 on the top wall part 11 side is joined to the top wall part 11 and the end face 24 on the bottom wall part 12 side is joined to the bottom wall part 12.

The first corrugated reinforcing members 20 of this embodiment are provided along the entire region in the X direction of the automobile structural member 1, but may be provided partially in the X direction of the automobile structural member 1 depending on a shape or a section required to be reinforced of the automobile structural member 1, or the like. A material of the first corrugated reinforcing member 20 is not particularly limited, and for example, a steel material, an aluminum alloy member, a magnesium alloy member, various resin materials such as a fiber reinforced resin, and so on, can be employed.

The bottom portions 22 of the first corrugated reinforcing members 20 are joined to the inner surfaces of the heightwise wall parts 13. By joining the bottom portions 22 of the first corrugated reinforcing members 20 to the inner surfaces of the heightwise wall parts 13 as the above, the automobile structural member 1 has closed cross-sections $S_1$ formed by the heightwise wall parts 13 and the first corrugated reinforcing members 20 in the cross section parallel to the top wall part 11 as in FIG. 4. A plurality of closed cross-sections $S_1$ are formed apart from each other along the X direction of the automobile structural member 1.

A joining method of the heightwise wall part 13 and the first corrugated reinforcing member 20 is not particularly limited, and is changed appropriately depending on the shape of the automobile structural member 1, the shape of the first corrugated reinforcing member 20, or the like. For example, the heightwise wall part 13 and the member such as a hat-shaped sheet pile may be joined by T-shaped fillet welding through arc welding or the like, spot welding, laser welding or adhesion using an adhesive, or the like. Further, by integrally molding the heightwise wall part 13 and the first corrugated reinforcing member 20 through extrusion molding, for example, the heightwise wall part 13 and the first corrugated reinforcing member 20 may be joined. When the heightwise wall part 13 and the first corrugated reinforcing member 20 are integrally molded, the automobile structural member 1 can be manufactured by joining the top wall part 11 and the bottom wall part 12 to the integrally molded heightwise wall part 13 and first corrugated reinforcing member 20 by welding or the like, for example. Note that a joining method of the end face 23 on the top wall part 11 side and the top wall part 11 and a joining method of the end face 24 on the bottom wall part 12 side and the bottom wall part 12, which are previously described, may also be the T-shaped fillet welding through arc welding or the like, the spot welding, the laser welding, the adhesion using an adhesive, or the like.

The automobile structural member 1 of this embodiment is configured as described above. In the automobile structural member 1 in which the bottom portions 22 of the first corrugated reinforcing members 20 are joined to the inner surfaces of the heightwise wall parts 13 and the closed cross-sections $S_1$ are formed by the heightwise wall parts 13 and the first corrugated reinforcing members 20, surface rigidity of the top wall part 11 is improved. This enables the improvement in energy absorption performance. Further, as indicated by later-described examples, since such an automobile structural member 1 as described in this embodiment is also excellent in the energy absorption efficiency, it is possible to achieve both a reduction in weight and the energy absorption performance.

Figure 13:
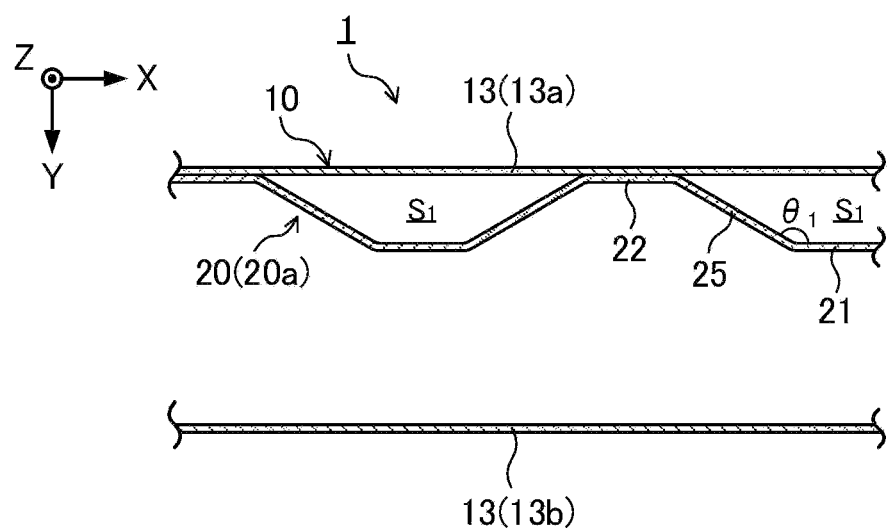
FIG. 13 is a view illustrating one example of a first corrugated reinforcing member.

Note that in the automobile structural member 1 in FIG. 4, the first corrugated reinforcing member 20 is provided for each of the first heightwise wall part 13a and the second heightwise wall part 13b, but the first corrugated reinforcing member 20 may be provided only for the heightwise wall part 13 of either of a pair of the heightwise wall parts 13 as in FIG. 13. When the first corrugated reinforcing member 20 is provided inside the automobile structural member 1 as in FIG. 13, the first corrugated reinforcing member 20 is joined to either of the heightwise wall parts 13 without being joined to both the heightwise wall parts 13 of a pair of the heightwise wall part 13.

Second Embodiment

Figure 14:
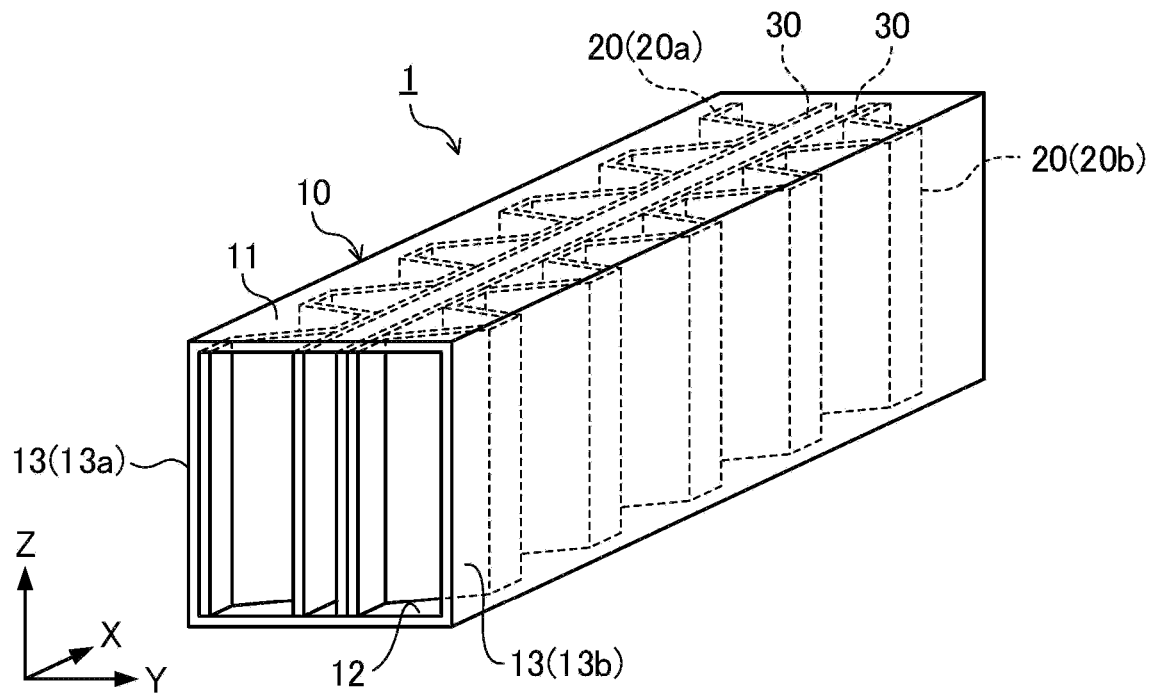
FIG. 14 is a perspective view illustrating a schematic configuration of an automobile structural member according to a second embodiment of the present invention.
Figure 15:
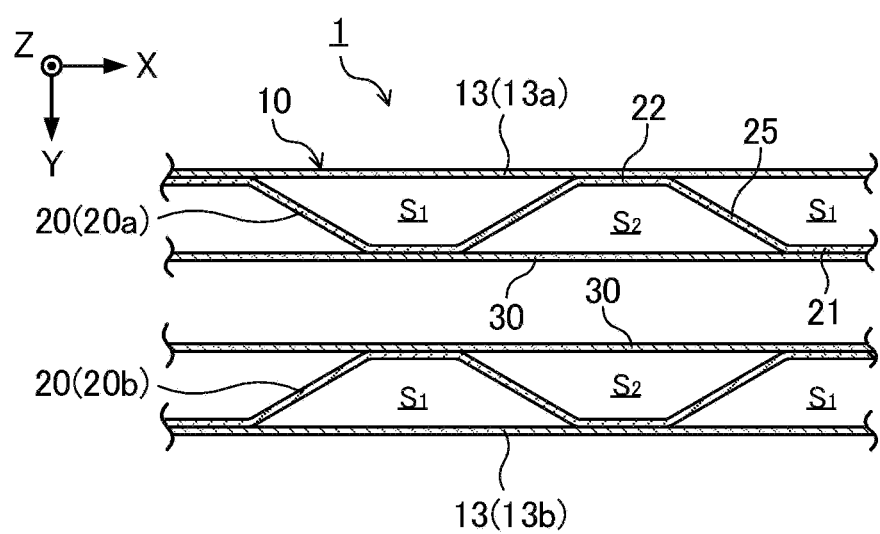
FIG. 15 is a view illustrating a cross section parallel to a top wall part of the automobile structural member in FIG. 14.

As illustrated in FIG. 14 and FIG. 15, an automobile structural member 1 of a second embodiment further has second reinforcing members 30 in addition to first corrugated reinforcing members 20. The second reinforcing members 30 are joined to top portions 21 of the first corrugated reinforcing members 20. This causes formation of closed cross-sections $S_2$ by providing the first corrugated reinforcing members 20 and the second reinforcing members 30. That is, the automobile structural member 1 of the second embodiment has first closed cross-sections $S_1$ formed by heightwise wall pars 13 of a hollow section 10 and the first corrugated reinforcing members 20 and the second closed cross-sections $S_2$ formed by the first corrugated reinforcing members 20 and the second reinforcing members 30.

The second reinforcing members may be further joined to at least either wall part of a top wall part 11 and a bottom wall part 12 of the hollow section 10 in addition to being joined to the first corrugated reinforcing members 20. A joining method of the first corrugated reinforcing member 20 and the second reinforcing member 30 is not particularly limited, and for example, may also be a joining method by T-shaped fillet welding through arc welding or the like, spot welding, laser welding, adhesion using an adhesive, or the like. Further, the first corrugated reinforcing member 20 and the second reinforcing member 30 may be integrally molded through extrusion molding, for example. A material of the second reinforcing member 30 is not particularly limited, and for example, a steel material, an aluminum alloy member, a magnesium alloy member, various resin materials such as a fiber reinforced resin, and so on, can be employed. Further, the second reinforcing member 30 may be partially provided with a bead, a hole, or the like.

According to the automobile structural member 1 of the second embodiment, surface rigidity of the top wall part 11 is further enhanced, which enables the improvement in energy absorption performance.

Although one embodiment of the present invention has been described above, the present invention is not limited to such an example. It should be understood that various changes or modifications are readily apparent to those skilled in the art within the scope of the technical spirit as set forth in claims, and those should also be covered by the technical scope of the present invention as a matter of course.

For example, in the above-described first to second embodiments, the first corrugated reinforcing member 20 is in such a shape as a hat-shaped sheet pile, but a shape of the first corrugated reinforcing member 20 in a cross section parallel to the top wall part 11 is not particularly limited. For example, in the first corrugated reinforcing member 20, top portions 21 and bottom portions 22 may each be in a curved surface shape in a cross section parallel to the top wall part 11 as in FIG. 16, or top portions 21 and bottom portions 22 may each be pointed in a cross section parallel to the top wall part 11 as in FIG. 17.

EXAMPLES

Figure 18:
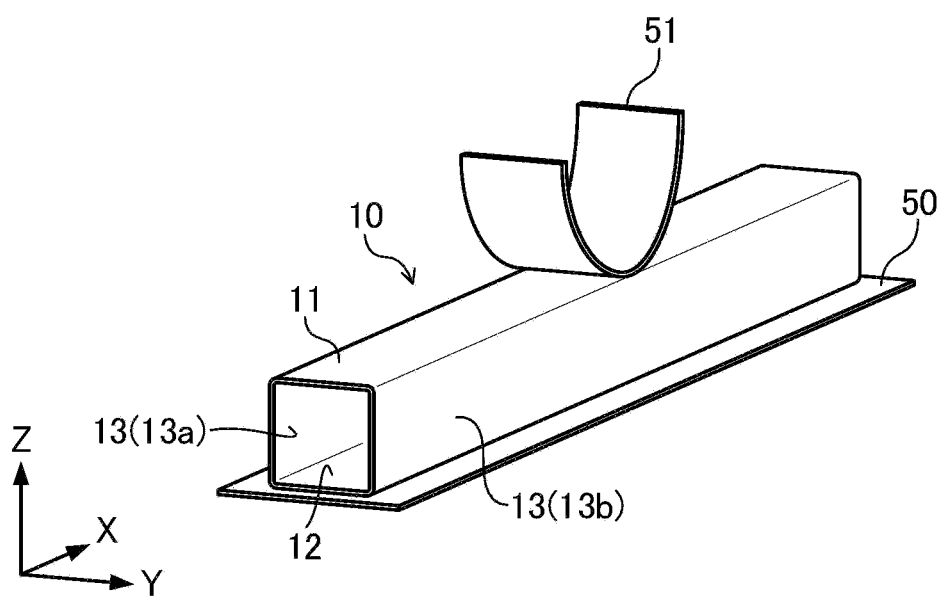
FIG. 18 is a view illustrating a condition of a bending crush simulation.

A bending crush simulation of automobile structural members was conducted. FIG. 18 is a view illustrating a simulation condition, and on an outer side of a bottom wall part 12 of an automobile structural member 1, a rigid plate 50 is provided. The simulation is performed by pressing an impactor 51 with ϕ254 into a top wall part 11 in an analysis model provided with two first corrugated reinforcing members inside the automobile structural member 1 in FIG. 18. The automobile structural member 1 is an angular tube-shaped steel material, and a length in the member longitudinal direction (X direction) of the automobile structural member 1 is 1000 mm, and a sheet thickness thereof is 1.0 mm A shape of a cross section perpendicular to the X direction of the automobile structural member 1 is a square, and a cross sectional size is 100 mm square. A material of the first corrugated reinforcing member is a steel material, and a sheet thickness thereof is 1.0 mm Both end surfaces in the X direction of the automobile structural member 1 are completely restricted in this simulation.

[Simulation (1)]

Figure 19:
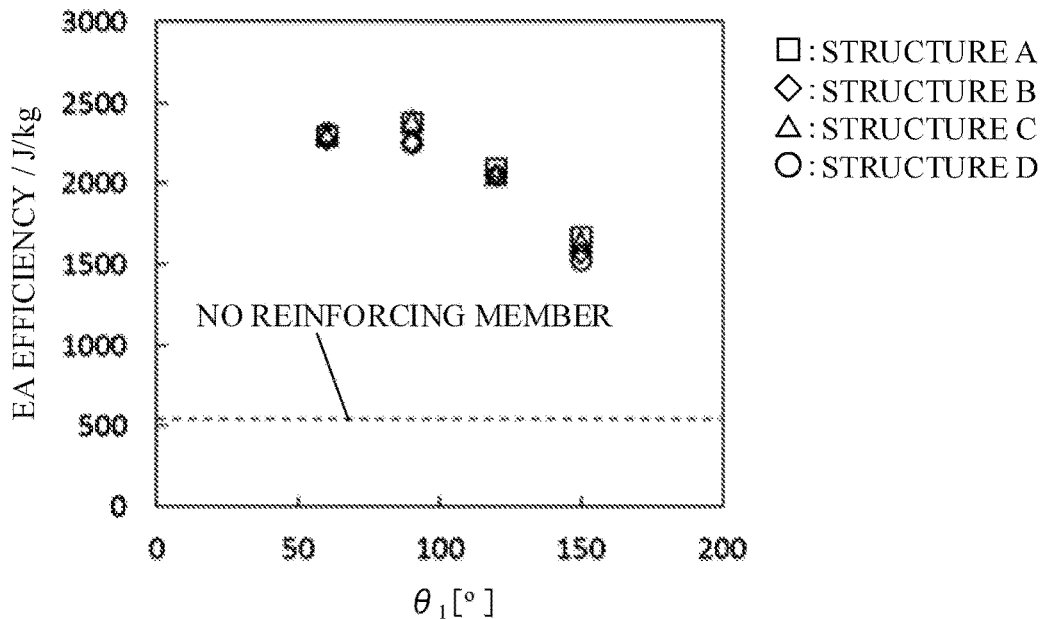
FIG. 19 is a chart illustrating energy absorption efficiencies of analysis models in a simulation (1).

A simulation was performed by a plurality of analysis models which were different in the angle $\theta_1$ formed by the top portion 21 and the side portion 25 of the first corrugated reinforcing member 20 (FIG. 4) and contact sections of the corrugated reinforcing members with wall parts of the automobile structural member 1. The following Table 1 and FIG. 19 present results of this simulation. Note that a structure A in Table 1 and FIG. 19 is a structure in which the first corrugated reinforcing members are joined to the heightwise wall parts, the bottom wall part, and the top wall part of the automobile structural member. A structure B is a structure in which the first corrugated reinforcing members are joined to the heightwise wall parts and the bottom wall part of the automobile structural member (here, the top wall part is not joined to the first corrugated reinforcing members, but in contact therewith). A structure C is a structure in which the first corrugated reinforcing members are joined to the heightwise wall parts and the top wall part of the automobile structural member (here, the bottom wall part is not joined to the first corrugated reinforcing members, but in contact therewith). A structure D is a structure in which the first corrugated reinforcing members are joined to only the heightwise wall parts of the automobile structural member (here, the bottom wall part is not joined to the first corrugated reinforcing members and the top wall part is not joined to the first corrugated reinforcing members, but they are in contact with the first corrugated reinforcing members). Further, an "EA efficiency" in Table 1 and FIG. 19 indicates energy absorption efficiencies of the analysis models at a time of a stroke of 50 mm in the impactor. Note that the distance $d_1$ between the plane $P_2$ formed by the plurality of bottom portions 22 and the plane $P_1$ formed by the plurality of top portions 21 of the first corrugated reinforcing member 20 was set to 20 mm ($d_1/D_1$=0.20).

TABLE 1

| | CONTACT SECTION OF REINFORCING MEMBER | EA EFFICIENCY (J/kg) | | | |
|---|---|---|---|---|---|
| | | $\theta_1 = 60°$ | $\theta_1 = 90°$ | $\theta_1 = 120°$ | $\theta_1 = 150°$ |
| STRUCTURE A | HEIGHTWISE WALL PART, BOTTOM WALL PART, CEILING WALL PART | 2296 | 2378 | 2098 | 1667 |
| STRUCTURE B | HEIGHTWISE WALL PART, BOTTOM WALL PART | 2277 | 2254 | 2057 | 1564 |
| STRUCTURE C | HEIGHTWISE WALL PART, CEILING WALL PART | 2302 | 2394 | 2057 | 1641 |
| STRUCTURE D | HEIGHTWISE WALL PART | 2318 | 2254 | 2044 | 1526 |

As illustrated in FIG. 19, in any of the analysis models, the EA efficiency was improved as compared with an analysis model provided with no corrugated reinforcing member. From a viewpoint of effectively improving the EA efficiency, the angle $\theta_1$ is preferably 150 degrees or less, and more preferably 120 degrees or less.

[Simulation (2)]

Figure 10:
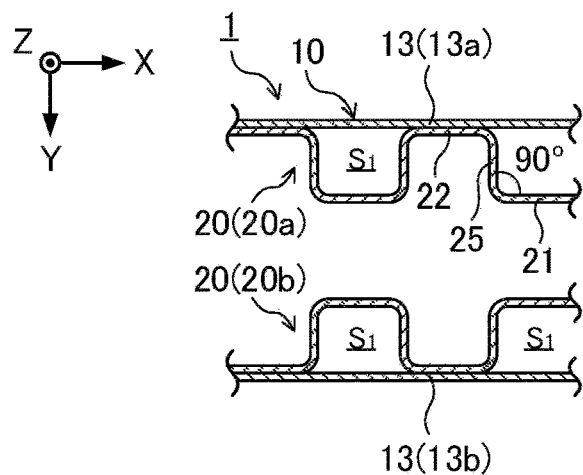
FIG. 10 is a view illustrating one example of a first corrugated reinforcing member.
Figure 11:
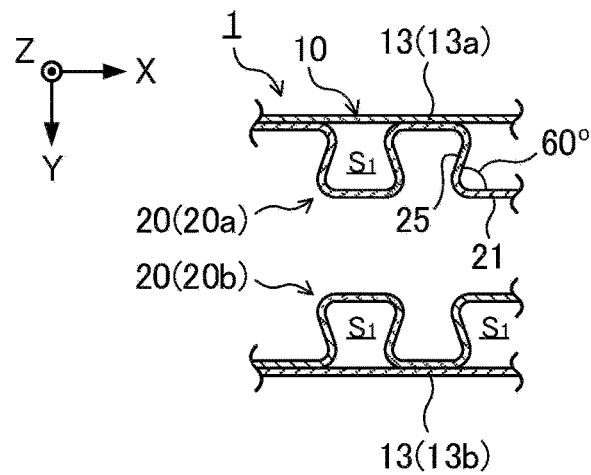
FIG. 11 is a view illustrating one example of a first corrugated reinforcing member.
Figure 20:
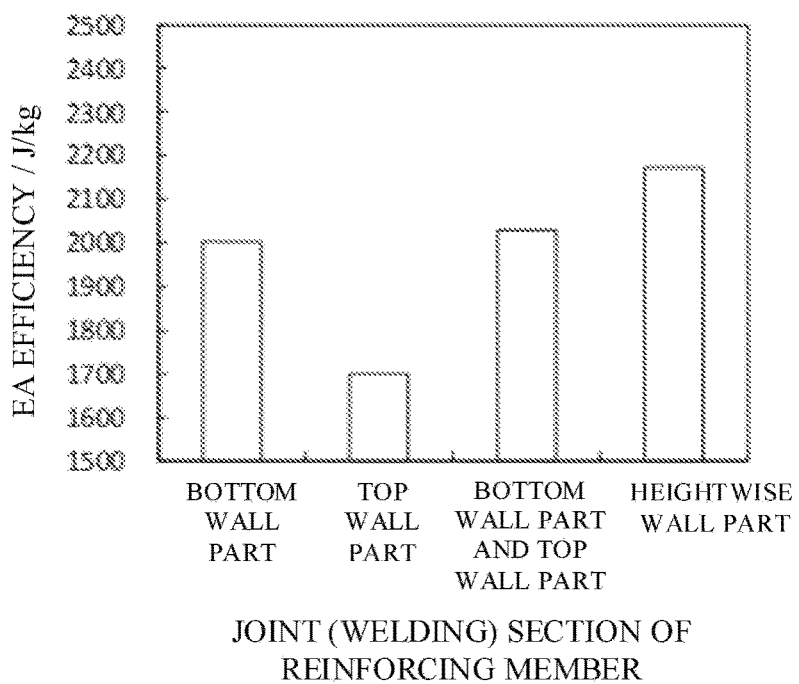
FIG. 20 is a chart illustrating energy absorption efficiencies of analysis models in a simulation (2).

A simulation was performed, in which the distance $d_1$ between the plane $P_2$ formed by the plurality of bottom portions 22 and the plane $P_1$ formed by the plurality of top portions 21 of the first corrugated reinforcing member 20 was set to 20 mm ($d_1/D_1$=0.20), regarding an influence of the presence/absence of the junction of the heightwise wall parts and the first corrugated reinforcing members which gives the EA efficiency, in a shape with the angle $\theta_1$ of 90 degrees as in FIG. 10. FIG. 20 illustrates results of this simulation. As illustrated in FIG. 20, the EA efficiency was the highest in a case where the first corrugated reinforcing members were joined to the heightwise wall parts. Note that a structure conditioned to weld only the heightwise wall parts in this simulation (refer to a right end in FIG. 20) is the same as the structure D in which the angle $\theta_1$ is 90 degrees in the simulation (1).

[Simulation (3)]

Figure 21:
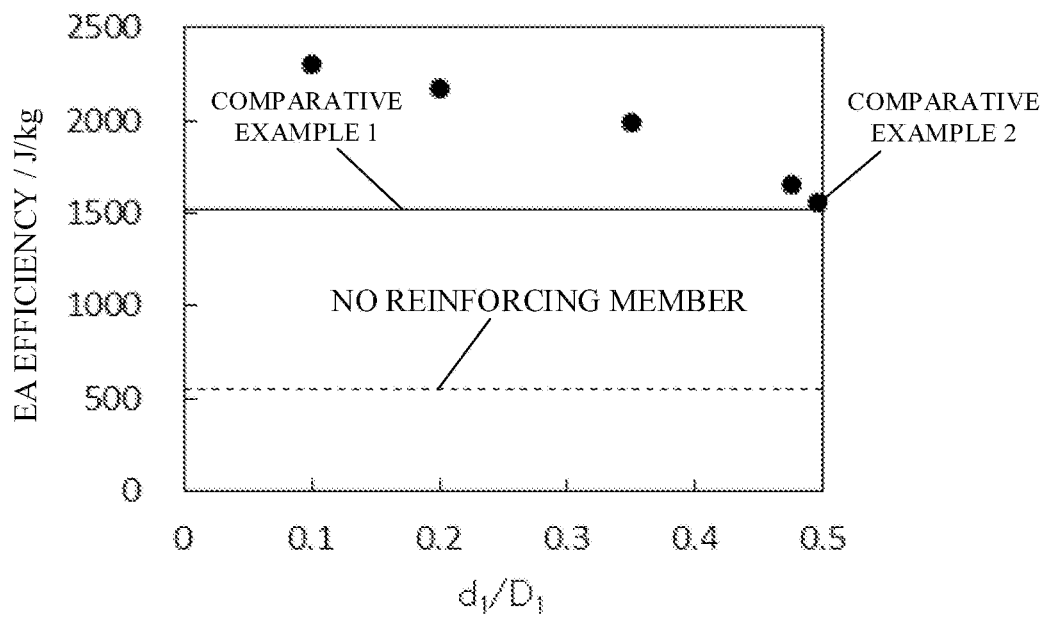
FIG. 21 is a chart illustrating energy absorption efficiencies of analysis models in a simulation (3).

On analysis models which were different in the ratio of $d_1/D_1$ between the distance $d_1$ between the plane $P_2$ formed by the plurality of bottom portions 22 and the plane $P_1$ formed by the plurality of top portions 21 of the first corrugated reinforcing member 20 (FIG. 4) and the distance $D_1$ between the two heightwise wall parts 13a, 13b (FIG. 4), a simulation was performed with the first corrugated reinforcing member 20 having a shape with the angle $\theta_1$ of 90 degrees as in FIG. 10. FIG. 21 illustrates results of this simulation. Note that an analysis model in Comparative example 1 in FIG. 21 has a structure in which top portions of only one provided first corrugated reinforcing member are joined to an inner surface of one heightwise wall part of the two heightwise wall parts and bottom portions of the first corrugated reinforcing member are joined to an inner surface of the other reinforcing member of them. An analysis model in Comparative example 2 has a structure in which one each of corrugated reinforcing members is joined to each of the heightwise wall parts and top portions of the corrugated reinforcing members are joined to each other.

As illustrated in FIG. 21, it is found that the structure in which the one corrugated reinforcing member is joined to a pair of the heightwise wall parts (Comparative example 1) and the structure in which the top portions of the two corrugated reinforcing members are joined to each other (Comparative example 2) are poor in the EA efficiency.

[Simulation (4)]

A simulation was performed by a plurality of analysis models which were different in the distance $d_2$ between the top wall part 11 and the first corrugated reinforcing member 20 (FIG. 15) and the distance $d_2'$ between the bottom wall part 12 and the first corrugated reinforcing member 20. The structures of the automobile structural members in the analysis models are the same structure as the structure D ($\theta_1$=90°) in the simulation (1) except that the distance $d_2$ and the distance $d_2'$ are different from those of the structure D. Further, in the analysis models, the distance $d_2$ and the distance $d_2'$ are the same distance as each other.

Figure 22:
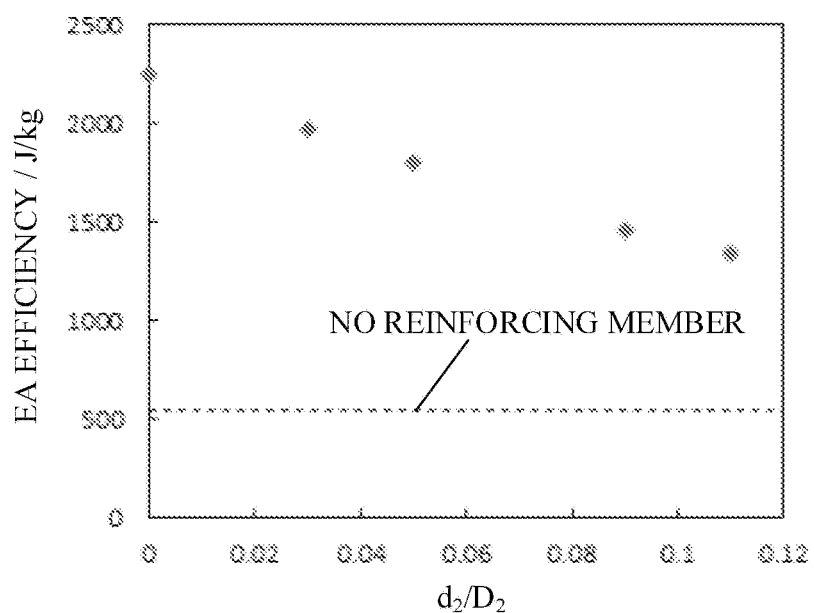
FIG. 22 is a chart illustrating energy absorption efficiencies of analysis models in a simulation (4).

FIG. 22 illustrates results of this simulation. Note that a horizontal axis in FIG. 22 is indicated by a ratio of $d_2/D_2$ between the distance $d_2$, and, the distance $D_2$ between the top wall part 11 and the bottom wall part 12. In FIG. 22, only values of $d_2/D_2$ are written, but as described previously, since the distance $d_2$ and the distance $d_2'$ are the same distance as each other in this simulation, in the analysis model with $d_2/D_2$ of 0.05, for example, $d_2'/D_2$ is also 0.05. As illustrated in FIG. 22, in any of the analysis models, the EA efficiency was improved as compared with an analysis model provided with no corrugated reinforcing member. In particular, it is found that in the structure of $d_2/D_2$=0 and $d_2'/D_2$=0, namely, the structure in which the first corrugated reinforcing members 20 are in contact with the top wall part 11 and the bottom wall part 12, the EA efficiency becomes the highest and this structure is a preferable structure.

[Simulation (5)]

Figure 23:
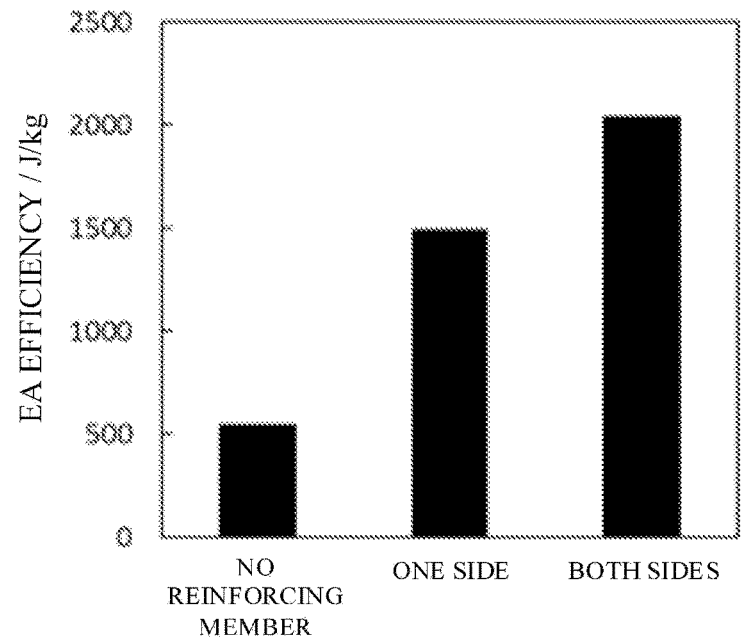
FIG. 23 is a chart illustrating energy absorption efficiencies of analysis models in a simulation (5).

A simulation was performed by an analysis model provided with the first corrugated reinforcing member on one side of a pair of the heightwise wall parts as in FIG. 13 and an analysis model provided with the first corrugated reinforcing members on both sides of a pair of the heightwise wall parts as in FIG. 4. A joint section of the automobile structural member to the first corrugated reinforcing member in each of the analysis models is only on the heightwise wall part, and the angle $\theta_1$ is 120 degrees. FIG. 23 is a chart illustrating energy absorption efficiencies (EA efficiencies) of the analysis models at a time of a stroke of 50 mm in the impactor. As illustrated in FIG. 23, also in the analysis model provided with the first corrugated reinforcing member on one side of a pair of the heightwise wall parts, the EA efficiency was improved as compared with an analysis model provided with no reinforcing member.

[Simulation (6)]

Figure 24:
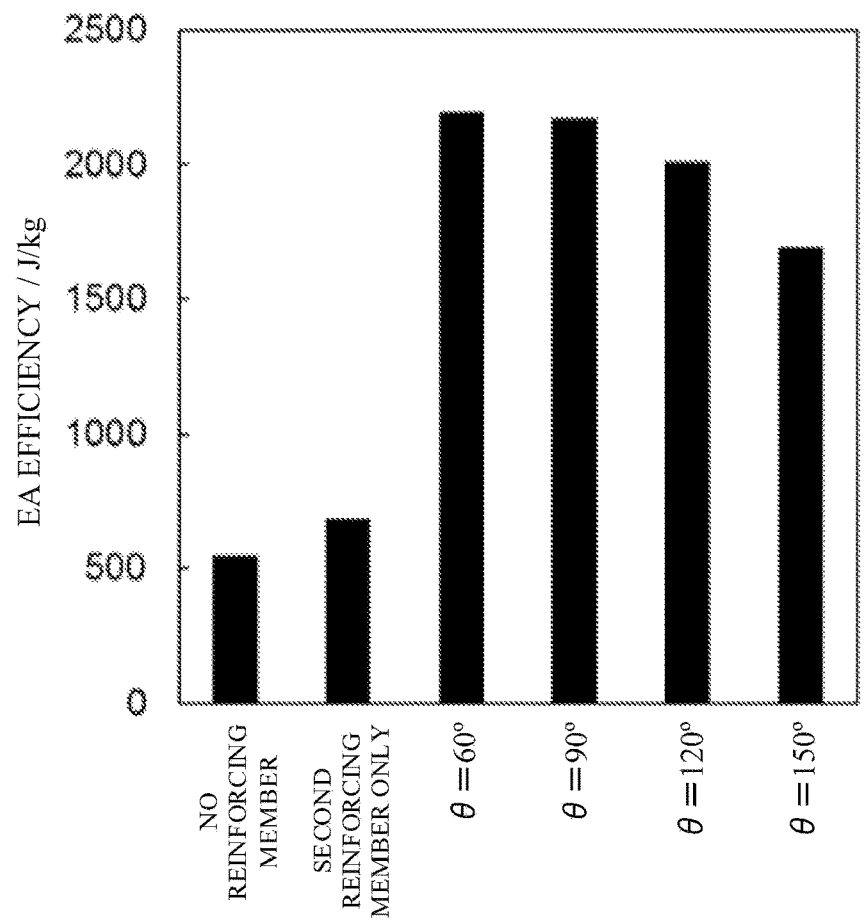
FIG. 24 is a chart illustrating energy absorption efficiencies of analysis models in a simulation (6).

A simulation was performed by analysis models provided with the second corrugated reinforcing members as in FIG. 15. The analysis models are the model provided with only the second reinforcing members without being provided with the first corrugated reinforcing member and the models in which the second reinforcing members are joined to the first corrugated reinforcing members which are different in the angles $\theta_1$ as in FIG. 4, FIG. 9 to FIG. 11. FIG. 24 is a chart illustrating energy absorption efficiencies (EA efficiencies) of the analysis models at a time of a stroke of 50 mm in the impactor. As illustrated in FIG. 24, by combining the first corrugated reinforcing members and the second reinforcing members, the EA efficiency was improved as compared with an analysis model provided with no reinforcing member.

[Simulation (7)]

Figure 16:
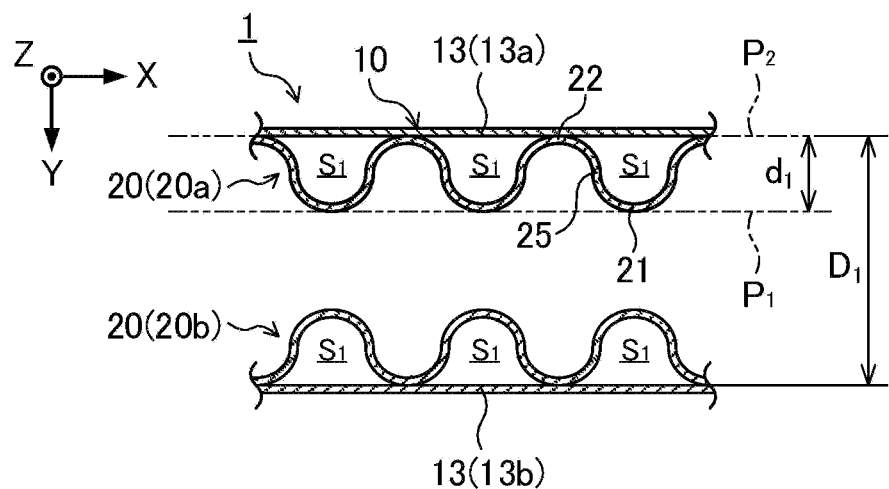
FIG. 16 is a view illustrating one example of a first corrugated reinforcing member.
Figure 17:
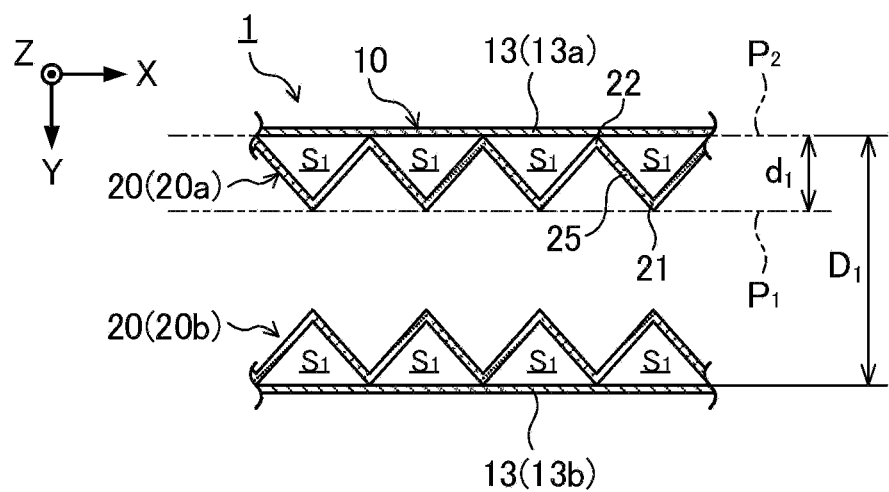
FIG. 17 is a view illustrating one example of a first corrugated reinforcing member.
Figure 25:
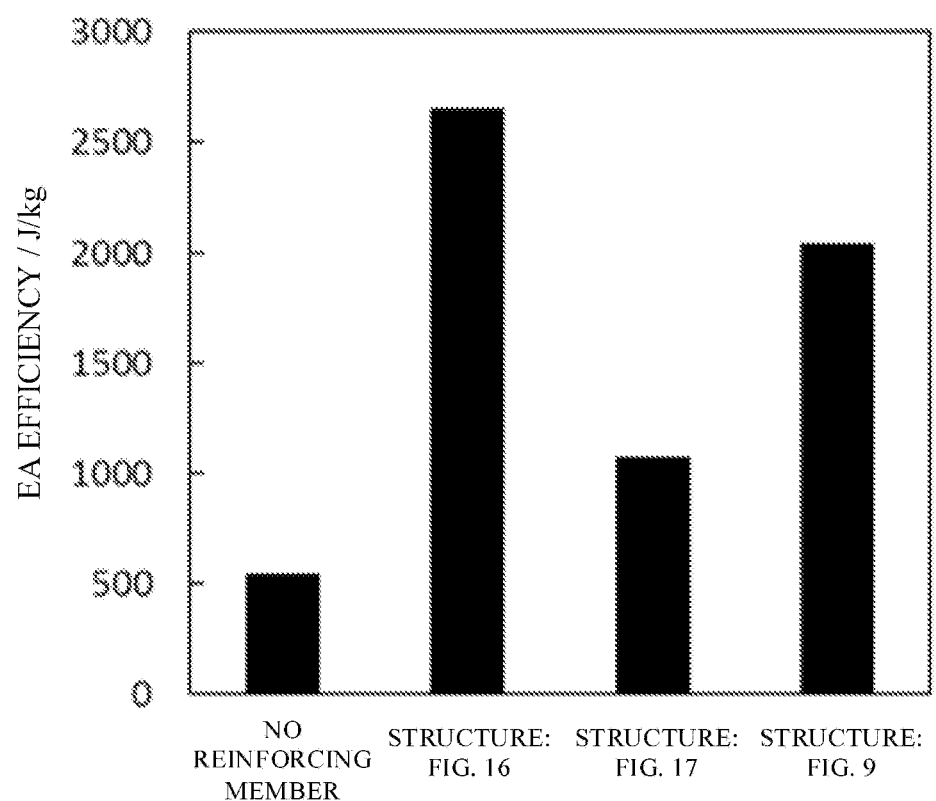
FIG. 25 is a chart illustrating energy absorption efficiencies of analysis models in a simulation (7).

A simulation was performed by an analysis model having the first corrugated reinforcing members in FIG. 16 and an analysis model having the first corrugated reinforcing members in FIG. 17. FIG. 25 is a chart illustrating energy absorption efficiencies (EA efficiencies) of the analysis models at a time of a stroke of 50 mm in the impactor. As illustrated in FIG. 25, in any of the analysis models, the EA efficiency was improved as compared with an analysis model provided with no reinforcing member.

INDUSTRIAL APPLICABILITY

The present invention can be utilized as, for example, a side sill, a bumper beam, a center pillar, a side member of a ladder frame, or a cross member of a ladder frame.

EXPLANATION OF CODES 1 automobile structural member
10 hollow section
11 top wall part
12 bottom wall part
13 heightwise wall part
13a first heightwise wall part
13b second heightwise wall part
15 outer panel
15a top wall part
15b heightwise wall part
15c flange part
16 inner panel
16a top wall part
16b heightwise wall part
16c flange part
17 panel
17a top wall part
17b heightwise wall part
17c flange part
18 plate
20 first corrugated reinforcing member
21 top portion
22 bottom portion
23 end face on top wall part side
24 end face on bottom wall part side
25 side portion
30 second reinforcing member
50 rigid plate
51 impactor
$D_1$ distance between heightwise wall parts
$d_1$ distance between plane formed by a plurality of bottom portions and plane formed by a plurality of top portions of first corrugated reinforcing member
$D_2$ distance between top wall part and bottom wall part
$d_2$ distance between top wall part of automobile structural member and end face on top wall part side of first corrugated reinforcing member
$d_2'$ distance between bottom wall part of automobile structural member and end face on bottom wall part side of first corrugated reinforcing member
$P_1$ plane formed by a plurality of top portions of first corrugated reinforcing member
$P_2$ plane formed by a plurality of bottom portions of first corrugated reinforcing member
$S_1$ first closed cross-section
$S_2$ second closed cross-section
$\theta_1$ angle formed by top portion and side portion of first corrugated reinforcing member
$\theta_2$ angle formed by top portion of first corrugated reinforcing member and top wall part of automobile structural member

The invention claimed is:

1. An automobile structural member comprising a hollow automobile structural member having: a top wall part; a bottom wall part facing the top wall part; and a pair of heightwise wall parts that connect to the top wall part and the bottom wall part, the automobile structural member comprising
   a first corrugated reinforcing member inside the automobile structural member, wherein:
   a bottom portion and a top portion of the first corrugated reinforcing member extend in a direction from the top wall part toward the bottom wall part; and
   the bottom portion of the first corrugated reinforcing member is joined to an inner surface of the heightwise wall part of one of a pair of the heightwise wall parts, and
   the automobile structural member further comprising
   the other first corrugated reinforcing member in which the bottom portion is joined to the heightwise wall part facing the heightwise wall part to which the first corrugated reinforcing member is joined; inside the automobile structural member, wherein:
   the two first corrugated reinforcing members are not in contact with each other;
   in each of the two first corrugated reinforcing members, a distance between a plane formed by a plurality of bottom portions and a plane formed by a plurality of top portions is 8 to 40% of a distance between the two heightwise wall parts of the automobile structural member; and
   in each of the two first corrugated reinforcing members, a cross-section shape perpendicular to the direction from the top wall part toward the bottom wall part is substantially the same from the top wall part to the bottom wall part.

2. The automobile structural member according to claim 1, wherein an end face on the top wall part side of the first corrugated reinforcing member is in contact with the top wall part, and an end face on the bottom wall part side of the first corrugated reinforcing member is in contact with the bottom wall part.

3. The automobile structural member according to claim 2, wherein the end face on the top wall part side of the first corrugated reinforcing member is joined to the top wall part, or the end face on the bottom wall part side of the first corrugated reinforcing member is joined to the bottom wall part.

4. The automobile structural member according to claim 3, wherein the end face on the top wall part side of the first corrugated reinforcing member is joined to the top wall part, and the end face on the bottom wall part side of the first corrugated reinforcing member is joined to the bottom wall part.

5. The automobile structural member according to claim 1, further comprising
   a second reinforcing member extending along a longitudinal direction of the automobile structural member, wherein the second reinforcing member is joined to the top portion of the first corrugated reinforcing member.

6. The automobile structural member according to claim 1, wherein the heightwise wall part and the first corrugated reinforcing member are integrally molded.

7. The automobile structural member according to claim 1, wherein an angle which the top portion of the first corrugated reinforcing member forms with the top wall part is substantially perpendicular.

8. The automobile structural member according to claim 1, wherein the automobile structural member is a side sill, a bumper beam, a center pillar, a side member of a ladder frame, or a cross member of a ladder frame.

* * * * *